UNITED STATES PATENT OFFICE.

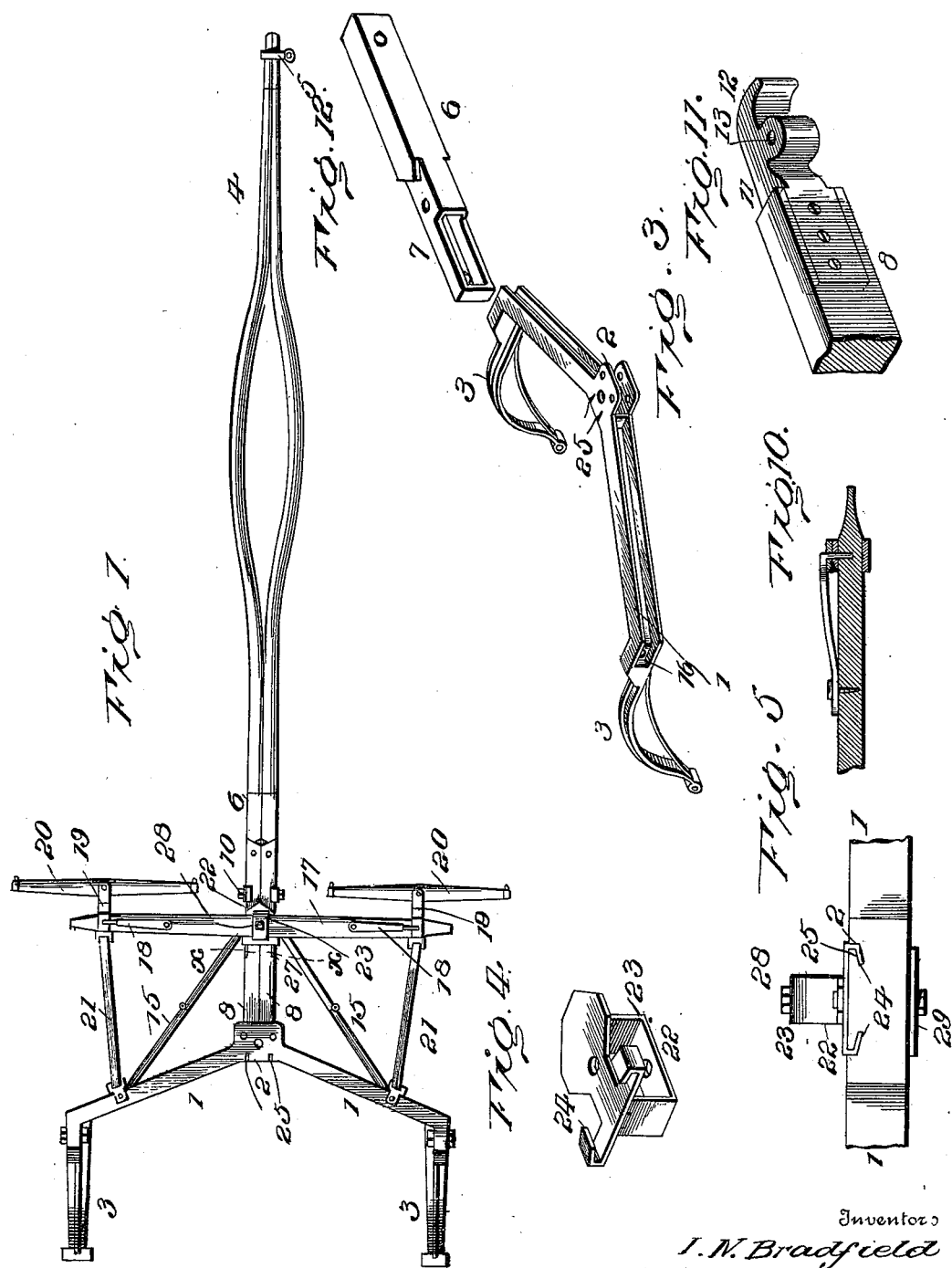

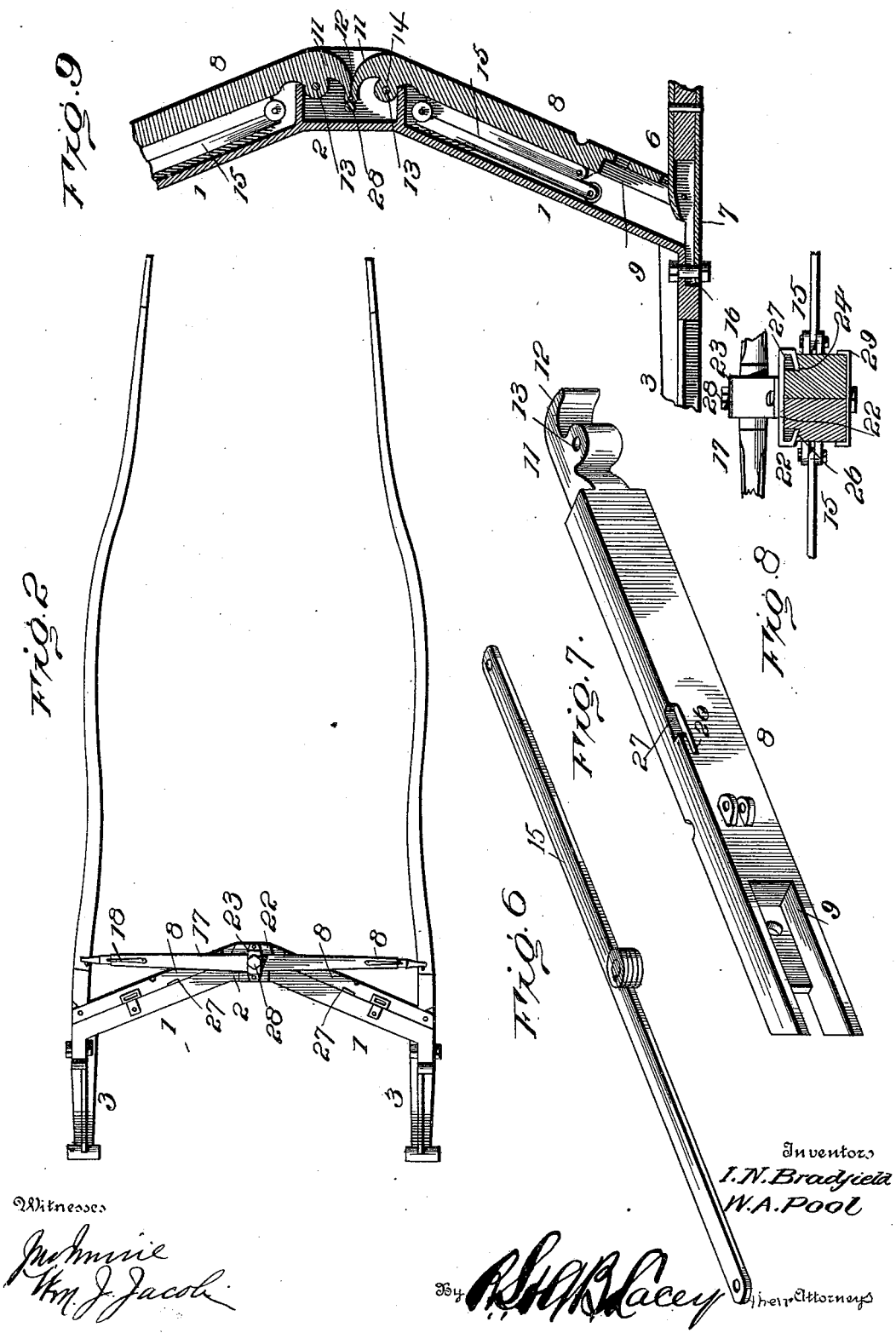

ISAAC N. BRADFIELD AND WILLIAM A. POOL, OF FALLIS, OKLAHOMA TERRITORY.

COMBINED VEHICLE POLE AND SHAFTS.

SPECIFICATION forming part of Letters Patent No. 665,363, dated January 1, 1901.

Application filed May 15, 1900. Serial No. 16,794. (No model.)

*To all whom it may concern:*

Be it known that we, ISAAC N. BRADFIELD and WILLIAM A. POOL, citizens of the United States, residing at Fallis, in the county of Lincoln and Territory of Oklahoma, have invented certain new and useful Improvements in a Combined Vehicle Pole and Shafts; and we do hereby declare the following to be a full, clear, and exact description of the invention, such as will enable others skilled in the art to which it appertains to make and use the same.

This invention provides in a single structure a vehicle pole or tongue and shafts, the device being readily convertible as required from one to the other, according as a single or a span of horses are to be hitched to the vehicle to be drawn.

The characteristic feature of the invention is a device of the nature aforesaid involving a light, compact, and durable construction, and, withal, easily changed to adapt it for use either as a pole or shafts.

The invention consists of the novel features, details of construction, and combination of the parts, which hereinafter will be more fully disclosed and finally claimed, and for this purpose, and also to acquire a knowledge of the merits of the invention and the structural details of the means whereby the results are attained, reference is to be had to the appended description and the drawings hereto attached.

While the essential and characteristic features of the invention are necessarily susceptible of modification, still the preferred embodiment of the invention is illustrated in the accompanying drawings, in which—

Figure 1 is a top plan view of the device adjusted for use as a pole or tongue. Fig. 2 is a view similar to Fig. 1, showing the device as it appears when ready for use as shafts or thills. Fig. 3 is a perspective view of the yoke. Fig. 4 is a perspective view of the hammer-strap inverted. Fig. 5 is a rear view of the middle portion of the yoke, showing the hammer-strap in position. Fig. 6 is a detail view of a folding hound. Fig. 7 is a perspective view of a connecting swing-bar. Fig. 8 is a transverse section on the line X X of Fig. 1 looking toward the front end of the pole. Fig. 9 is a horizontal section of an end portion of the yoke, showing the relation of the parts when the device is adapted for use as shafts. Fig. 10 is a detail section of the end portion of the doubletree. Fig. 11 is a detail perspective view of a modified form of connecting swing-bar. Fig. 12 is a detail view in perspective of the iron at the inner end of the shaft or pole member.

Corresponding and like parts are referred to in the following description and indicated in all the views of the drawings by the same reference characters.

The combined pole and shafts comprise a yoke to which the members or parts of the pole are pivotally attached and which consists, essentially, of divergent bars 1, a central portion 2, and parallel end portions 3, which are curved rearwardly and downwardly and terminate in eyes to receive the coupling-pins, by means of which the yoke is connected to the axle of the vehicle. The component parts of the yoke are practically of integral formation, being either cast or forged, thereby obviating the formation of joints and providing a comparatively light and substantial structure. By having the bars 1 rearwardly divergent the draft is applied to the yoke to the best possible advantage. The central part 2 as well as the bars 1 are recessed in their front sides to lighten the structure and to provide a housing for the folding hounds and the inner pivotal ends of the connecting swing-bars. The shafts 4, likewise constituting the pole members, are reinforced at their ends by metal tips or irons and are oppositely curved intermediate of their ends for transverse strength. This is shown most clearly in Fig. 1, in which the end portions of the shafts are shown lying side by side and the intermediate portions oppositely curved. The outer ends of the shafts 4 are held together by suitable means, and, as shown, a clamp 5 is fitted thereto in such a manner as to be readily removable to admit of the separation of the shafts when changing the device from a pole, so as to adapt it for a single horse. The irons 6, secured to the inner ends of the shafts 4, have their rear end portions reduced, as shown at 7, to enter recesses formed at the outer ends of the swing-bars 8 and the outer ends of the divergent bars 1, according to the relative disposition of the parts. The shoulders formed at the inner ends of the reduced parts 7 are oppositely inclined, so as to make a close joint with the pivotal ends of the bars 8 in either of their extreme positions. Each of the swing-bars 8 is cleft at its outer end to embrace the top and bottom sides of the reduced parts 7 of the irons 6, to which they are pivotally connected, and their outer sides are recessed for a short distance from their cleft ends, as shown at 9, to receive the said parts 7, the latter being held in the said recesses 9 by means of a transverse bolt 10. The inner or rear ends of the swing-bars are reduced to enter the recess formed in the front side of the central portion 2 of the yoke, as shown at 11, and the terminals of the reduced ends 11 curve in opposite directions, as shown at 12, so as to touch and brace the bars 8 in any adjusted position within their range of movement. Eyes 13 are formed at the outer side of the reduced ends 11 to receive bolts 14, by means of which the swing-bars 8 are pivotally connected to the yoke. Folding hounds 15 connect the swing-bars 8 with the bars 1, and their members are connected by a rule-joint which is adapted to break inward when folding. The hounds when folded are snugly housed within the forward recessed sides of the bars 1, so as to be out of the way and concealed from view. The swing-bars 8 connect the shafts or pole members 4 with the yoke and are of a length to fold against the front sides of the bars 1 and admit of the reduced ends 7 of the irons 6 entering the recesses 16 at the outer ends of the parts 1 and 3. The doubletree 17 is adapted to be connected either to the central portion 2 of the yoke or to the intermediate portion of the swing-bars and is provided at its ends with fastenings 18 of spring form and having their outer ends bent so as to engage with clips 19, carrying the singletrees 20, which are held in place thereby when fitted to the doubletree. Straps 21 connect the end portions of the doubletree with the outer end portions of the bars 1 and limit the swing thereof.

When the device is used as a pole, the doubletree 17 is fitted to the swing-bars, and when adjusted for use as shafts or thills the doubletree is fitted to the part 2, and the straps 21 and singletrees 20 are dispensed with. The hammer-strap comprises a base-plate 22 and a keeper 23, the latter spanning the doubletree and secured at its ends to the base-plate. Tongues 24 project from the base-plate 22 and incline toward each other in opposite directions and are adapted to engage with oppositely-inclined cuts 25 and 26, formed, respectively, in the rear portion of the part 2 and in the sides of the swing-bars 8. These tongues 24 are adapted to make detachable connection with the sets of cuts 25 and 26 by a sliding movement. Notches 27 are formed in the sides of the swing-bars 8 and communicate with the inclined cuts 26 and admit of the tongues 24 having free ingress and egress from the said cuts 26. The hammer-strap when positioned either upon the part 2 or upon the swing-bars 8 is held in position by means of the tongues 24 and a bolt 28. It will be observed that the tongues 24 embrace the sides of the swing-bars 8 and hold the latter from outward displacement at intermediate points. The plate 29 is located at the under side of the swing-bars 8 when brought together, and its end portions are bent to embrace opposite sides of the said swing-bars, thereby supplementing the action of the tongues 24 when holding the swing-bars from outward displacement.

Fig. 1 shows the disposition of the parts when the device is adapted for use as a vehicle pole or tongue, the shafts or pole members 4 being brought together and secured in the manner stated, the doubletree being fitted to the swing-bars, the hounds being unfolded, and the straps 21 and singletrees 20 being in position. When the device is altered for use as shafts or thills, the straps 21 and singletrees are dispensed with and the doubletree is fitted to the part 2, the hounds folded so as to lie within the recessed sides of the bars 1, the shafts 4 spread, and the connecting swing-bars 8 folded against the bars 1, with the rear ends of the irons 6 attached to the outer ends of the bars 1 in the manner stated.

Inasmuch as the coupling end 11 of the connecting-bar 8 is subjected to wear and strain, it is proposed to doubly secure it to the main portion of the bar, so as to be replaced when required without necessitating the provision of an entire new bar.

Having thus described the invention, what is claimed as new is—

1. In a convertible pole and shafts for vehicles, a yoke, pole members or shafts, swing-bars having pivotal connection at their ends, with, respectively, the central portion of the yoke and the inner terminals of the said shafts and adapted in one position to aline with and form extensions of the respective pole members and in the other position to lie against the yoke, and means for securing the outer ends of the swing-bars to the outer ends of the yoke, substantially as set forth.

2. In a convertible pole and shafts, a yoke, pole members or shafts, swing-bars having pivotal connection with, respectively, the central portion of the yoke and the inner terminals of the said pole members, and folding hounds connecting the swing-bars with opposite portions of the said yoke, substantially as set forth.

3. In a convertible pole and shafts, a yoke, pole members or shafts, swing-bars pivotally connected at their ends with, respectively, the yoke and the inner end portions of the said shafts, folding hounds connecting the swing-bars with the outer portions of the yoke, and means for connecting the inner or rear ends of the shafts with either the swing-bars or the outer ends of the yoke members, substantially as set forth.

4. In a convertible vehicle pole and shafts, a yoke having its central portion recessed, pole members or shafts, swing-bars pivotally connecting the said shafts with the yoke and having their inner ends reduced and formed with oppositely-curved terminals which touch at their inner faces so as to brace the pivotal ends of the swing-bars at every point in their range of movement, folding hounds connecting the swing-bars with the yoke, and means for connecting the terminals of the aforesaid shafts with either the swing-bars or the outer portions of the yoke, substantially as set forth.

5. In a convertible pole and shafts, a yoke recessed in its front side, shafts or pole members, swing-bars pivotally connecting the shafts with the yoke, folding hounds adapted to enter the recessed side of the yoke and concealed when folded by the swing-bars, and means for connecting the inner ends of the shafts with either the swing-bars or the outer ends of the yoke members, substantially as specified.

6. In a convertible pole and shafts, a yoke having recesses at its outer ends, pole members or shafts having reduced end portions, swing-bars pivotally connected at their inner ends with the yoke and having their outer sides recessed for a short distance to receive the reduced end portions of the said shafts, and means for securing the reduced end portions of the shafts in either the recessed portions of the swing-bars or the recesses at the outer ends of the yoke, substantially as set forth.

7. In a convertible pole and shafts, a yoke, pole members or shafts adapted to have their end portions brought together and lie side by side and their middle portions oppositely curved, means for securing the outer ends of the pole members when brought together, swing-bars pivotally connecting the inner ends of the said shafts with the yoke, means for connecting the rear ends of the shafts and the outer or front ends of the swing-bars, and independent means for connecting the inner ends of said shafts and the swing ends of the connecting-bars with the outer ends of the yoke, substantially as set forth.

8. In a draft appliance of the character described, a yoke having oppositely-inclined cuts, and a hammer-strap having its base portion provided with oppositely-inclined tongues to enter and coöperate with the aforesaid inclined cuts to hold the hammer-strap in position, substantially as set forth.

9. In a convertible pole and shafts, and in combination with the yoke, pole members and connecting swing-bars between said pole members and yoke and having oppositely-inclined cuts, a hammer-strap provided with oppositely-inclined tongues to make engagement with the inclined cuts of the said swing-bars, substantially as set forth.

10. In a convertible pole and shafts, and in combination with the yoke having oppositely-inclined cuts, pole members, and connecting swing-bars between the yoke and pole members and having oppositely-inclined cuts, and notches in communication with said cuts, a hammer-strap comprising a base-plate provided with oppositely-inclined tongues adapted to make detachable engagement by a sliding movement with either the inclined cuts of the swing-bars or the yoke, substantially as specified.

In testimony whereof we affix our signatures and seals in presence of two witnesses.

ISAAC N. BRADFIELD. [L. S.]
WILLIAM A. POOL. [L. S.]

Witnesses:
W. P. WAAS,
W. H. FALLIS.